April 21, 1953     J. J. LARMOUR     2,635,328
METHOD OF MAKING INLAID ARTICLES
Filed Jan. 11, 1949
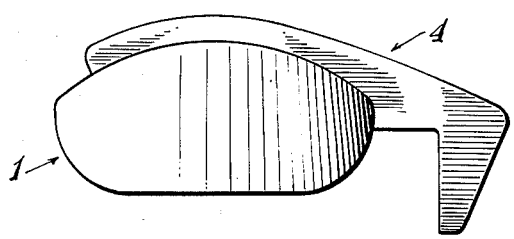
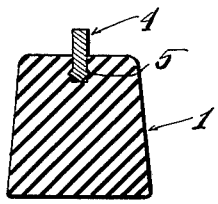
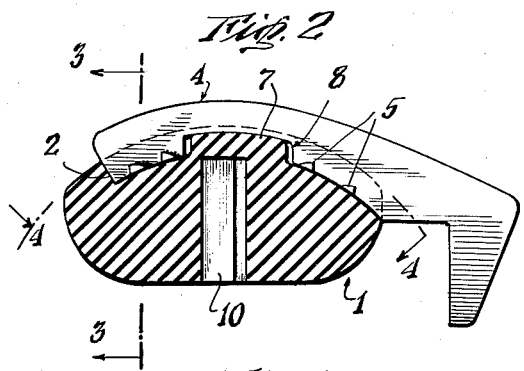
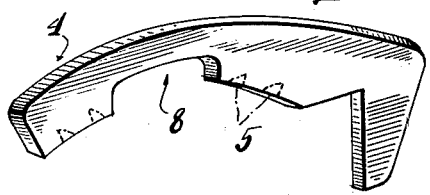
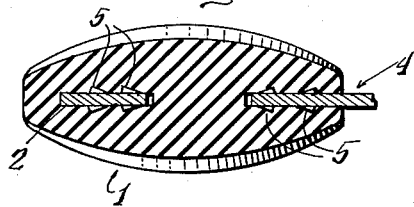
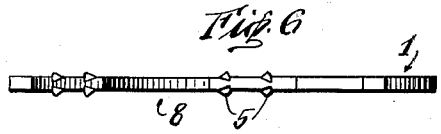
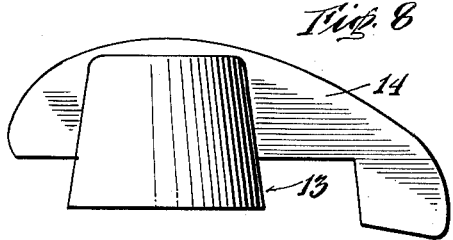
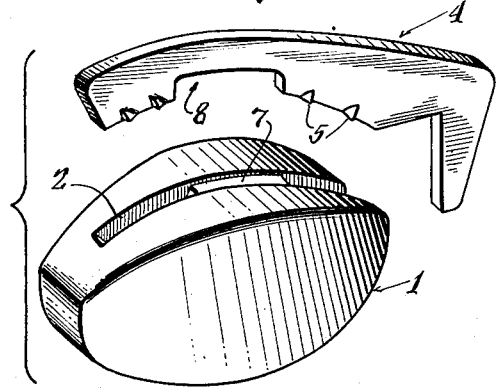
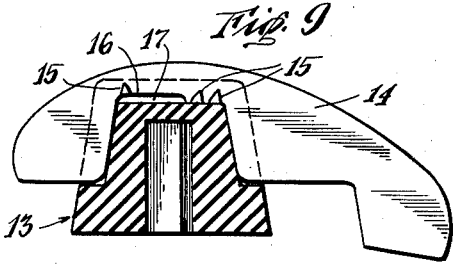
INVENTOR.
James J. Larmour
BY
Norman H. Allard
ATTORNEY Patented Apr. 21, 1953

2,635,328

UNITED STATES PATENT OFFICE 2,635,328

METHOD OF MAKING INLAID ARTICLES

James J. Larmour, Summit, N. J., assignor to Plastic Inlays, Inc., Summit, N. J., a corporation of New Jersey Application January 11, 1949, Serial No. 70,169

3 Claims. (Cl. 29—148)

The present invention relates to the manufacture of composite articles and more particularly to those comprising a molded plastic member and an inlaid metal member.

Although molded plastic articles have gone into extensive use for a great variety of products it is in many instances desirable to "inlay" or unite the plastic article with one or more metal members. The resulting composite article may be desired for its enhanced decorative effect or for utilitarian purposes, such as a plastic knob in combination with a metallic pointer or marker.

A major difficulty in connection with the manufacture of such articles has been that of obtaining a relatively simple and yet secure and positive connection or interlock between the plastic and metal members. This interconnection between the members should be one which can be readily and quickly made without requiring special tools, equipment, reheating of parts, or the like. Previous attempts along these lines have been lacking in one or more of the aforementioned respects; some have required heating of one or both parts of the article prior to assembling, others have proven of too complicated construction for commercially feasible methods of assembly, still others have proven too expensive and time-consuming by reason of special molding equipment required. A serious objection to many previous articles has been that the parts subsequently separated due to the lack of sufficient positive interlocking engagement between the various members comprising the finished article.

The present invention aims to overcome the above and other difficulties or disadvantages by providing a new and improved method of making articles such as those mentioned and by providing new and improved composite articles.

An object is to provide a new and improved method of making inlaid articles.

A further object is to provide a new and improved article having a relatively thick metal member inlaid therein.

Still another object is to provide a new and improved method of interlocking the members of a composite article.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specifications, wherein:

Fig. 1 is a side elevational view showing one embodiment of the present invention;

Fig. 2 is a longitudinal sectional view through the article of Fig. 1;

Fig. 3 is a sectional view taken along the line 3—3 of Fig. 2;

Fig. 4 is a sectional view taken along the line 4—4 of Fig. 2;

Fig. 5 is a perspective view showing one form of metal member at an intermediate stage of manufacture;

Fig. 6 is a bottom plan view of the completed metal member;

Fig. 7 is an exploded perspective view illustrating a molded plastic member and a metal member about to be assembled;

Fig. 8 is a side elevational view showing another form of the present invention; and Fig. 9 is a longitudinal sectional view through the article illustrated in Fig. 8.

For purposes of convenience and clarity of description the term "plastic" is used to refer generally to any of the numerous synthetic molding compounds or materials suitable for forming articles or parts. The term "inlaid" is used in a general sense to denote that at least a portion of one member extends into another member.

The present invention is applicable to various types and shapes of articles but for illustrative purposes and clarity of description it is illustrated and described herein in the form of a plastic knob or handle having a metal indicator or pointer inlaid therein.

Referring more particularly to the embodiment of Figs. 1 through 4, there is shown a molded plastic knob member 1 having a recess or opening 2 into which extends a metal indicator or pointer member 4. The metal member is preferably fairly thick or heavy, for the knob shown being in the neighborhood of .08 inch. The metal member is shown substantially filling the width of the recess 2 so that opposite side walls of the metal insert member are closely adjacent or lightly in contact with adjoining side walls of the recess.

Positive interlocking engagement between the plastic member 1 and the metal member 4 is provided by relatively small and relatively sharp lateral projections or burrs 5 on the metal member which extend into the plastic member. Preferably the burrs 5 are located at or adjacent a lower edge of the metal member 4 and in assembled relationship (Figs. 1 through 4) are completely hidden from view. Preferably the plastic member 1 also has a projection 7 extending upwardly from the bottom of the recess 2 which fits into a complementary opening 8 in the metal member 4; the projection 7 of the plastic member 1 and the complementary opening 8 of the metal member 4 assist in properly locating these members with respect to each other during assembly of the parts 1 and 4.

The preferred method of making and assembling the article will now be described. The plastic member or members 1 may be molded or formed in any appropriate manner from some suitable material, being provided with the inlay-receiving recess 2, and the locating projection 7; where appropriate some attachment-facilitating means such as a socket 10 may be provided. The plastic member or part 1 may be formed into its final or finished shape since by the present method it is not necessary to subsequently reshape or treat it in any manner. Preferably the width of the recess 2 is such as to closely receive the member 4 to be inserted therein; where the insert member has a thickness of about .08 inch, the width of the recess 2 may be only slightly greater.

The metal insert member or members 4 may be stamped or formed from desired material, e. g., brass, and then subjected to any desired treatment such as finishing, polishing, lacquering, etc. In this treated condition the metal member 4 is complete except for the provision of the burrs or lateral projections 5, which may be provided at or adjacent a normally hidden lower edge of the metal member. Fig. 5 shows the metal member in this intermediate condition without the burrs, the location where the burrs 5 are to be formed being indicated by dotted lines.

The burrs or lateral projections 5 are now provided and while they may be formed in any suitable manner it is convenient and highly satisfactory to form them by placing the metal member in a stationary part of a press, with its lower edge facing upwardly, and to then move an "indenting" punch downwardly into contact with the upwardly facing edge of the metal member. While the indenting punch may have any suitable shape it is preferred that it be of such shape as to form substantially V-shaped openings at opposite side edges of the metal member by squeezing or deflecting metal edge portions slightly outwardly. As a result there are formed relatively sharp and relatively pointed projections or burrs 5. The amount of metal deflected is small and each projection has a sort of engaging barb (Figs. 2, 3, 4, 6, 7). While four burrs are shown at each corner edge of the metal member 5 it will be clear that a greater or lesser number may be utilized. Also, while it is preferred to have burrs at each side wall or face of the metal member they could project from only one side.

In some instances it may be desirable to form the metal member, complete with burrs, by a die casting operation or the like.

The molded members and the metal members may be separately manufactured in different plants by different subcontractors and thereafter shipped to a single location for assembling together.

To assemble the parts into a completed article the molded plastic member 1 may be placed on a suitable support with its recess 2 facing upwardly and the metal member 4 placed in alignment with the recess 2 with its burred lower edge facing toward the molded plastic member 1 (Fig. 7). In this relationship the metal member 4 is pushed "home" into the recess 2. Opposite side walls of the metal member 4 preferably pass between the spaced walls of the recess 2 and the burrs or projections 5 of the metal member engage with and slide along the side walls of the recess 2 during the seating movement. In fully seated relationship (Figs. 1 through 4) the burrs 5 extend outwardly into the body of the molded plastic member 4 and securely interlock the members together. The burrs 5 may tend to spread adjacent side wall portions slightly as the metal member is pushed downwardly toward the bottom of the recess 2, however, when it is endeavored to withdraw the metal member from the recess a high resistance is encountered which may be overcome only by applying considerable force. The parts are effectively retained together against separation incident to all normal conditions of usage.

The burrs 5 seem to retain the metal member 1 in engagement with the plastic member 1 with a sort of hook-like action. The burr-like projections 5 do not objectionably mar the outermost corners of the recess 2 during assembling of the members and the resulting composite article gives the appearance of a plastic part which has been molded in hot condition directly around portions of the metal member 4. While not essential, the projection 1 which extends upwardly an appropriate distance above the bottom of the recess 2 helps position or locate the insert member 4 during pressing together of the members 1 and 4.

Figs. 8 and 9 illustrate the application of the invention to a molded plastic member 13 and metal member 14 of slightly different shapes than those illustrated in Figs. 1 through 7. The metal member 14 is provided with three burrs 15 at each side of its lower edge similar to those already described, and also has a locating opening 16 adapted to cooperate with a locating projection 17 on the molded member 13. The method of assembling the two parts of this modified form of the invention is the same as that already described.

It will be seen that the present invention provides a new and improved method of inlaying or assembling the parts. The molded plastic members or knobs may be manufactured at one plant and the metal members or inserts may be manufactured at an entirely separate location, the parts being shipped to a single location and readily assembled to form a composite article having its parts securely interlocked or interengaged. The different members may be assembled at ordinary room temperatures without the necessity of first heating the metal member and without softening the plastic member in any way. The method of assembling the elements is rapid and efficient and may be readily performed without requiring special tools or other equipment. The composite article thus produced is well adapted to withstand any rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of making an article of the class described which comprises molding a rigid plastic member having a recess therein of a width substantially equal to the width of a metal member to be inserted therein, stamping from sheet metal an insert member, indenting an edge of said insert member to form a plurality of laterally projecting burrs at opposite faces of said insert member, said insert member having an imperforate cross section between said burred faces, and pressing the burred side faces of said metal insert member into said recess and engaging said burrs with side walls of the recess to thereby positively interlock said molded plastic member and metal insert member.

2. The method as claimed in claim 1 in which an upwardly extending projection is formed in said recess during molding of the plastic member, an opening generally complementary to said projection is formed in said insert member during stamping thereof, and said projection and opening co-operate in positioning the insert member during pressing thereof into the recess of the plastic member.

3. The method of making an article of the class described which comprises molding a rigid plastic member with a groove therein of width substantially equal to the width of a metal member to be inserted therein, shaping from metal an insert member, forming at spaced intervals and adjacent an edge of said insert member a plurality of isolated burrs projecting laterally from opposite faces of said insert member, said insert member having an imperforate cross section between said burred faces, maintaining said molded plastic member and metal insert member at substantially room temperature, positioning said edge of the insert member in proximity to and in alignment with said groove, and forcing the burred side faces of said metal insert member while at room temperature down into said groove and engaging said burrs with side walls of the groove to thereby positively interlock said molded plastic member and metal insert member.

JAMES J. LARMOUR.

References Cited in the file of this patent

UNITED STATES PATENTS

| Number | Name | Date |
| --- | --- | --- |
| 1,631,691 | Nagin | June 7, 1927 |
| 1,648,026 | Murray | Nov. 8, 1927 |
| 2,007,476 | Miller | July 9, 1935 |
| 2,052,616 | Gardes | Sept. 1, 1936 |
| 2,058,685 | Haan, Jr. | Oct. 27, 1936 |
| 2,069,427 | Stott | Feb. 2, 1937 |
| 2,106,379 | Newing | Jan. 25, 1938 |
| 2,129,257 | Bachmann | Sept. 6, 1938 |
| 2,177,191 | Sandberg | Oct. 24, 1939 |
| 2,231,347 | Reutter | Feb. 11, 1941 |
| 2,231,348 | Reutter | Feb. 11, 1941 |
| 2,231,349 | Reutter | Feb. 11, 1941 |
| 2,247,558 | Nichols | July 1, 1941 |
| 2,304,036 | Tegarty | Dec. 1, 1942 |